United States Patent
Redfern

(10) Patent No.: US 7,453,930 B2
(45) Date of Patent: Nov. 18, 2008

(54) METHOD AND SYSTEM OF TONE ORDERING FOR DISCRETE MULTI-TONE SYSTEMS WITH TONE GROUPING

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 11/154,892

(22) Filed: Jun. 16, 2005

(65) Prior Publication Data

US 2005/0281346 A1    Dec. 22, 2005

Related U.S. Application Data

(60) Provisional application No. 60/580,207, filed on Jun. 16, 2004.

(51) Int. Cl.
*H04B 1/38* (2006.01)
*H04L 27/28* (2006.01)

(52) U.S. Cl. .................................. 375/222; 375/260

(58) Field of Classification Search ............ 375/316, 375/222, 295, 285, 296, 346, 260, 286; 379/93.01
See application file for complete search history.

(56) References Cited

U.S. PATENT DOCUMENTS 6,219,378 B1 * 4/2001 Wu ........................... 375/231
2002/0172146 A1 * 11/2002 Wu et al. ..................... 370/208

OTHER PUBLICATIONS

Palm, Stephen, "Asymmetrical Digital Subscriber Line (ADSL) Transceivers," ITU-T Study Group 15 Question 4, G.992.1, Jul. 1999, 364 pages.

Palm, Stephen, "Updated Issues List For G.vdsl and G.vdsl2," ITU-T Study Group 15 Question 4, SS-U11R3, Jan. 19-23, 2004, 19 pages, Singapore.

Redfern, Arthur et al., "A Computationally and Memory Efficienct Tone Ordering Scheme For VDSL2," ITU-T Study Group 15 Question 4, MC-075, Mar. 8-12, 2004, 9 pages, Milbrae, California.

Schelstraete, Sigurd, "Very-High-Bit-Rate Digital Subscriber Line (VDSL) Metallic Interface," T1E1.4/2003-210R2, Aug. 22-26, 2003, 188 pages, Montreal, Canada.

Van Der Putten, "Asymmetrical Digital Subscriber Line (ADSL) Transceivers-2," ITU-T Study Group 15 Question 4, Jul. 2002, 301 pages, Switzerland, Geneva.

Peeters, Miguel; VDSL2; G.ploam: Tone grouping for VDSL2; Jun. 14-18, 2004; Temporary Document LB-051; Study Group 15.

* cited by examiner

*Primary Examiner*—Tesfaldet Bocure
(74) *Attorney, Agent, or Firm*—Steven A. Shaw; W. James Brady; Frederick J. Telecky, Jr.

(57) ABSTRACT

The present disclosure describes a method and system of tone ordering for discrete multi-tone (DMT) systems with tone grouping. Some illustrative embodiments may include a method, comprising, dividing a plurality of sub-channels within a discrete multi-tone symbol into a plurality of groups, selecting each sub-channel of the plurality of sub-channels in non-sequential sub-channel order from the plurality of groups, and assigning data bits in bit order to each sub-channel in the order in which each sub-channel is selected. Each group comprises an equal number of sub-channels, and each sub-channel comprises a frequency bin with a unique center frequency.

23 Claims, 3 Drawing Sheets

METHOD AND SYSTEM OF TONE ORDERING FOR DISCRETE MULTI-TONE SYSTEMS WITH TONE GROUPING

CROSS-REFERENCE TO RELATED APPLICATIONS

This application is a non-provisional application claiming priority to U.S. Provisional Application Ser. No. 60/580,207, filed on Jun. 16, 2004, and entitled "Method of tone ordering for DMT systems with tone grouping," which is hereby incorporated by reference.

BACKGROUND

1. Technical Field

The present subject matter relates to discrete multi-tone (DMT) communication systems. More particularly, the subject matter relates to the mapping of data to subcarrier frequencies or "tones" within a DMT signal.

2. Background Information

Discrete multi-tone (DMT) modulation has become a pervasive method for transmitting digital data. This data transmission scheme uses a series of subcarrier frequency bins or "tones," each with a unique center frequency. These tones are spread out within a frequency range or "band," each tone potentially carrying one or more bits of a larger unit of digital data. The tones are all modulated together in the frequency-domain so as to produce a waveform in the time-domain that is transmitted across a media (e.g., a twisted pair telephone cable) and received and demodulated at a receiver.

DMT modulation has found widespread use because it allows for simple equalizer design, allows for flexibility in the transmit spectrum, and is able to approach channel capacity through appropriate bit loading and gain scaling. Several different error detection and correction coding schemes have evolved, and many are used, both separately and in concert, within DMT transmissions. One such class of coding schemes, known as convolutional codes, operates on one or more bits at a time within a serial stream of data bits as they are received.

Many convolutional decoding algorithms (e.g., the Viterbi algorithm) tend to perform less efficiently when noise is present if the noise correlates to multiple, adjacent bits within a data stream. This means that if the noise affects multiple adjacent tones within a DMT signal, and if the noisy tones represent bits that are input in sequence into a decoder at the receiver, the decoder will be more likely to make errors.

To counter this effect, some data transmission standards (e.g., ADSL2) allow for random assignments of bits or groups of bits to the various DMT tones. This is known as "tone ordering." By appropriately assigning bits or groups of bits to the different tones within a band, noise bursts that affect adjacent groups of tones will affect groups of bits that are not all adjacent to each other in the demodulated bit stream, allowing convolutional decoders used at the receiver to operate more efficiently.

Tone ordering requires both the transmitter and receiver of a DMT signal to maintain a mapping of the bit(s)-to-tone, and tone-to-bit(s), as well as tables detailing other information (e.g., the number of bits per tone) for each tone. Such tables must be stored in both the transmitter and the receiver, thus utilizing some resources of each (e.g., space within a memory device). For DMT systems such as ADSL or ADSL2, this was not a significant problem given the number of tones that these technologies use (generally not more than a few hundred tones). Newer DMT technologies such as VDSL, however, may use as many as 4,096 tones, and the amount of memory needed for the tables, as well as the time required to traverse them during processing, is thus proportionally larger.

Proposals have been presented in the context of VDSL2 to reduce the table sizes by grouping consecutive tones together and storing information organized or indexed by group (see M. Peters, *Tone Grouping for VDSL2*, ITU-T Study Group 15 Question 4, LB-051, June 2004). But grouping consecutive tones together keeps adjacent bits within the data stream together, and the above-described effects related to correlated noise and convolutional decoders resurface. Further, as the group size is increased to produce greater resource efficiency, the decoder sensitivity to correlated noise also increases, resulting in a decrease in the performance of the decoder. A method and system that allows grouping of tones for increased resource efficiency, but without a corresponding decrease in decoder performance is thus desirable.

SUMMARY

The present disclosure describes a method and system of tone ordering for discrete multi-tone (DMT) systems with tone grouping. Some illustrative embodiments may include a method comprising dividing a plurality of sub-channels within a discrete multi-tone symbol into a plurality of groups, selecting each sub-channel of the plurality of sub-channels in non-sequential sub-channel order from the plurality of groups, and assigning data bits in bit order to each sub-channel in the order in which each sub-channel is selected. Each group comprises an equal number of sub-channels, and each sub-channel comprises a frequency bin with a unique center frequency.

Other illustrative embodiments may include a communication system comprising a processor that executes software, a discrete multi-tone (DMT) receiver, coupled to and configurable by the processor, a memory coupled to the processor, and a group tone order table stored in the memory. Each group within the group tone order table comprises an equal number of DMT sub-channels. The software selects a sub-channel in non-sequential order with respect to an adjacent sub-channel number, and assigns data bits in bit order to the sub-channel in the order in which the sub-channel is selected.

Yet further illustrative embodiments may include a storage medium containing software that can be executed on a processor within a communication system and that causes the processor to divide a plurality of sub-channels within a discrete multi-tone signal into a plurality of groups of sub-channels, select sub-channels from the plurality of sub-channels in non-sequential sub-channel order from the plurality of groups, and assign data bits in bit order to the sub-channels in the order in which the sub-channels are selected. Each sub-channel comprising a frequency bin with a unique center frequency.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function.

In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more parts and may be used to refer to a computer system or a portion of a computer system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
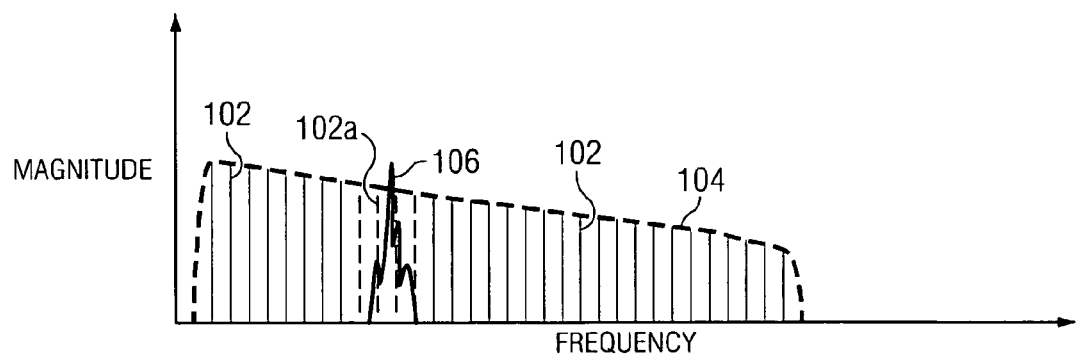
FIG. 1 illustrates a discrete multi-tone (DMT) signal, generated in accordance with at least some preferred embodiments.

Discrete Multi-tone (DMT) signals comprise a plurality of discrete "frequency bins" or "tones," each tone having a unique center frequency within a frequency band. FIG. 1 illustrates a DMT signal generated in accordance with at least some of the preferred embodiments. The individual tones 102 are equally spaced out with respect to one another within the spectral band 104. The magnitude of a particular tone may vary as shown, and some tones (e.g., tones 102a) may not be used (e.g., those near noise spike 106).

Figure 2:
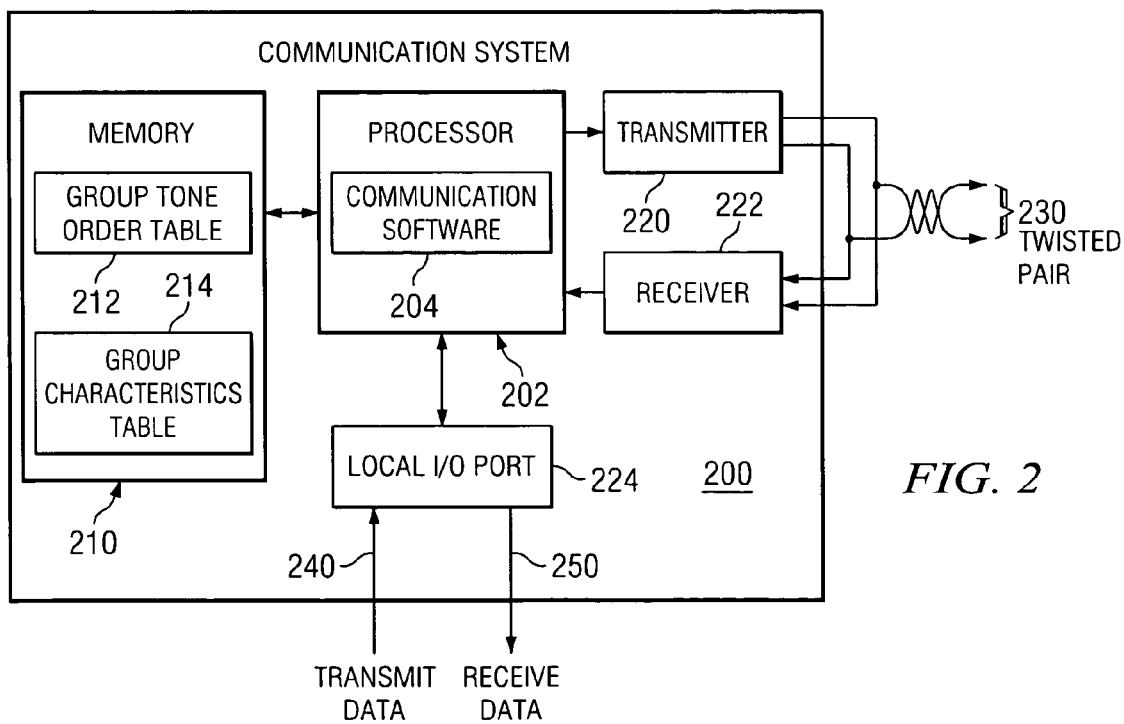
FIG. 2 illustrates a DMT transceiver, constructed in accordance with at least some preferred embodiments.

FIG. 2 illustrates a communication system 200 capable of generating and decoding a DMT signal, and constructed in accordance with at least some preferred embodiments. The communication system 200 comprises a transmitter (Xmittr) 220 and a receiver (Rcvr) 222, each coupled to a twisted-pair transmission line 230. The communication system further comprises a processor 202, which couples to both the transmitter 220 and the receiver 222, as well as to local input/output (I/O) port 224 and memory 210. The processor 202 comprises and executes communication software (Comm S/W) 204, and memory 210 comprises group tone order table 212 and group characteristics table 214.

Data may be received and transmitted by processor 202, which performs the DMT modulation of transmit data (Xmit Data) 240 received by local I/O port 224 for transmission by transmitter 220, and also performs the demodulation of DMT modulated data received by receiver 222 that is subsequently transmitted by local I/O port 224 as receive data (Recv Data) 250. The processor 202 accesses the tables 212-214 within memory 210, each of which contains tone-ordering information used as part of the modulation and demodulation process. The tone-ordering information in these tables allows the processor 202 to determine which bits are associated with which tones for both the transmitted and received DMT signals present on the twisted-pair transmission line 230.

Referring again to FIG. 1, the tones 102 are modulated such that bits of information may be encoded within each tone 102 of the band 104 that is used for data transmission of a DMT symbol. Bits or groups of bits may be assigned to each tone using any number of tone orderings. For example, a very simple tone ordering may be to assign bits to the tones in bit-order, based on the bit capacity of each tone. Thus, bits 0-1 may be assigned to the first tone if it has a capacity of two bits, bits 2-5 may be assigned to the second tone if it has a capacity of four bits, and likewise for the remaining bits and tones.

Figure 3:
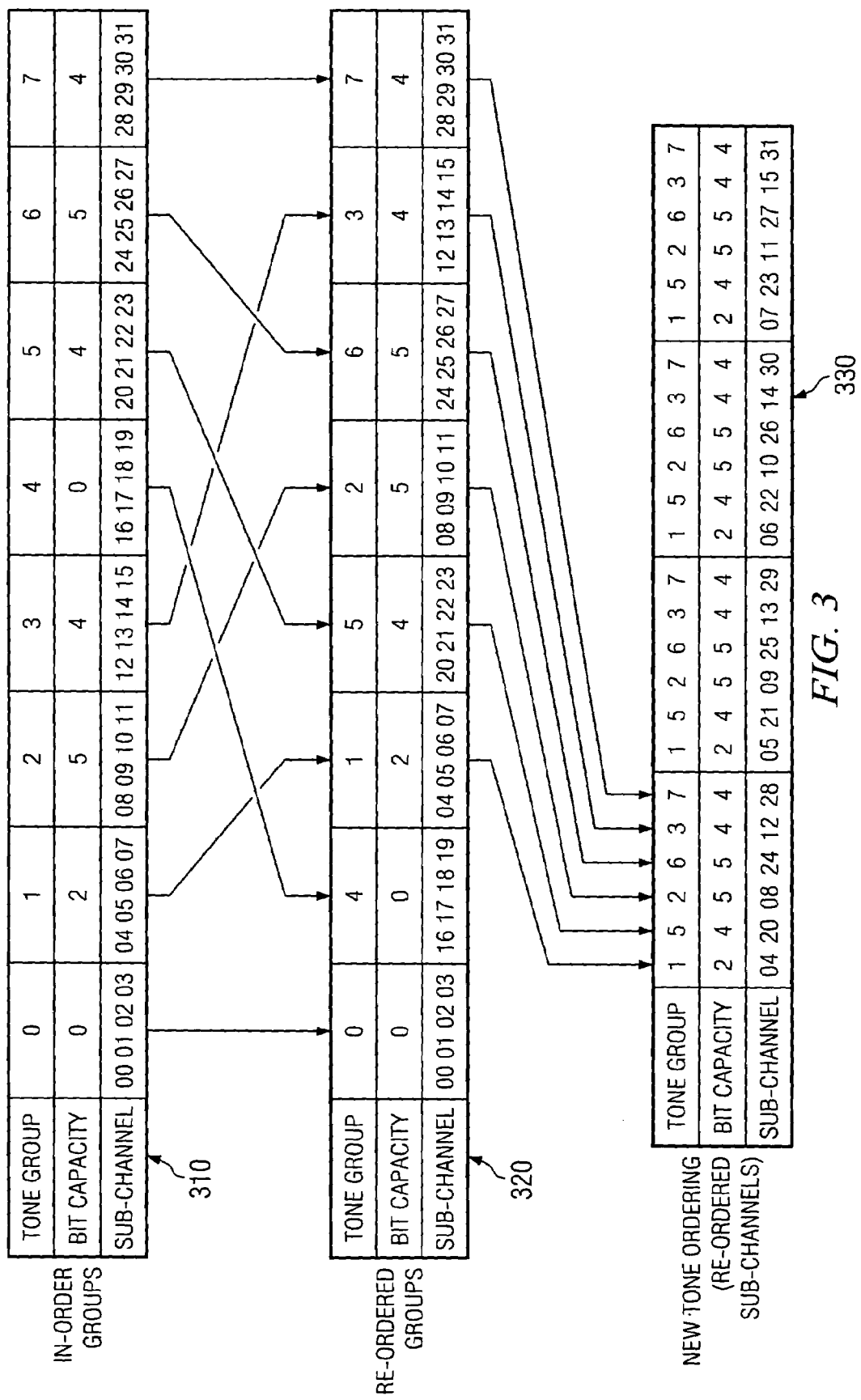
FIG. 3 illustrates a sequence for re-ordering and re-sequencing tone ordering tables in accordance with at least some preferred embodiments.

FIG. 3 illustrates a bit ordering in accordance with at least some preferred embodiments. Tone groups are defined comprising individual tones or "sub-channels," wherein the tones within a group each share a common characteristic (e.g., the same bit capacity). The information may be saved in sets of tables that associate sub-channels within tone groups from a group tone-ordering table with bit capacities from a group characteristics table. Referring to the in-order groups set of tables 310, for example, the sub-channels of group 0 cannot support any bits (0 bits, and thus unusable), the sub-channels of group 1 can support 2 bits, and likewise for the remaining sub-channels and groups.

As shown in FIG. 3, groups of tones may be defined, each of a predetermined group size (4 sub-channels per group in the example shown). In the first phase of the tone ordering of the preferred embodiments, the in-order groups may be re-sequenced such that the sub-channels of one group are not in sequential order with respect to the sub-channels of an adjacent group. This is illustrated in FIG. 3 by the re-ordered groups set of tables 320. Thus, for example, group 5 (comprising sub-channels 20-23) is adjacent to group 1 (comprising sub-channels 04-07) and group 2 (comprising sub-channels 08-11), neither of which includes sub-channels that immediately precede or follow sub-channels 20-23.

In the second phase of the tone ordering of the preferred embodiments, a new tone ordering may be created by sequentially selecting one sub-channel from each of the re-ordered groups. As illustrated in the New Tone Ordering set of tables 330 of FIG. 3, the first new tone ordering includes sub-channels 04, 20, 08, 24, 12, and 28, which are the first sub-channels from each of groups 1, 5, 2, 6, 3, and 7. Likewise, the second new tone ordering includes the second sub-channel of each reordered group, the third new tone ordering includes the third sub-channel of each reordered group, and the fourth new tone ordering includes the fourth sub-channel of each reordered group. Unusable tones or sub-channels (represented as sub-channels with a 0 bit capacity) may be excluded from the reordered groups and the new tone ordering to increase the efficiency of the sort and of the subsequent use of the resulting tone ordering table.

Figure 4:
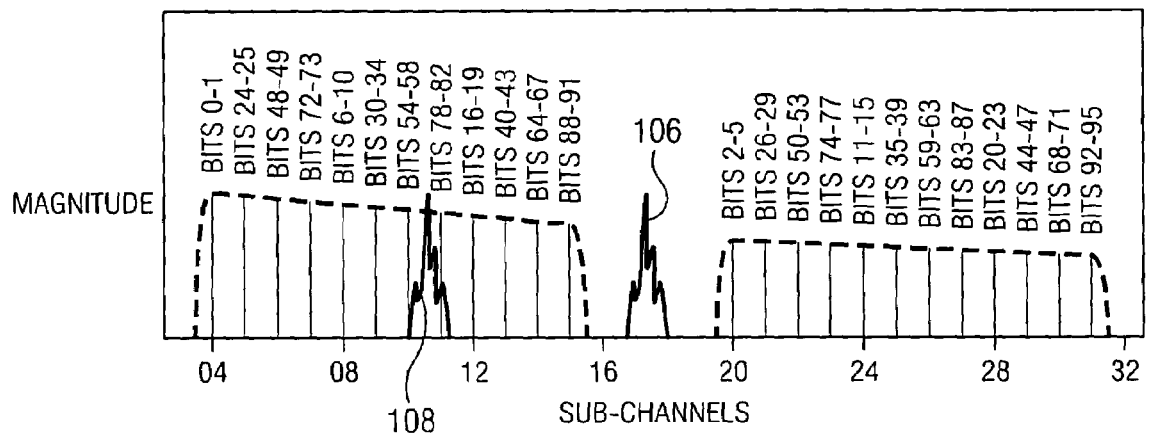
FIG. 4 illustrates a resulting to order achieved in accordance with at least some preferred embodiments.

The new tone ordering that results from the re-ordering of the sub-channels from the re-ordered groups lists the sub-channels in the order in which groups of bits from the data stream are assigned to tones. This tone ordering is shown in the New Tone Ordering set of tables of FIG. 3. The sub-channels are listed in the order in which they are used to carry individual bits of information. Thus, based on the illustrative embodiments of FIG. 3, tone 4, with a bit capacity of 2 bits, represents bits 0 and 1. Tone 20, second in the list of tones and with a bit capacity of 4 bits, represents bits 2-5. The assignment of bits continues down the list of sub-channels in the full tone order table, and results in a distribution of the data bits of a 96-bit data word as shown in FIG. 4. Other data word sizes are possible, and may include coding schemes with redundant data representation, error detection, and/or error correction capabilities. It is intended that the present disclosure encompass all such variations and embodiments.

By following the aforementioned approach to grouping sub-channels, reordering the groups, then algorithmically reordering the sub-channels within a re-ordered group, adjacent bit groupings may be distributed throughout the frequency band or bands used to transmit and receive data. This may permit more efficient DMT receiver decoder operation in the presence of noise localized in frequency, such as noise spike 108 shown in FIG. 4. At the same time, the use of groups still may permit the communication system 200 of FIG. 2 to store less information regarding the characteristics of a sub-channel (e.g., bit capacity, gain, and shaping) by storing the information for a group of sub-channels rather than each sub-channel individually. Thus, the storage requirements for this information, given a tone group size G, could be reduced by a factor of G as compared to other techniques that implement full mapping of individual tones.

Figure 5:
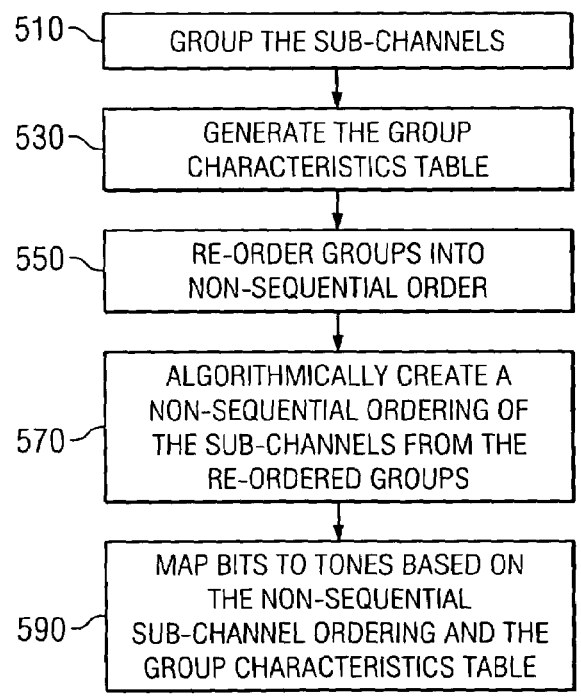
FIG. 5 illustrates a method for ordering DMT tones in accordance with at least some preferred embodiments.

FIG. 5 illustrates a method 500 for determining a tone ordering in accordance with at least some preferred embodiments. Sub-channels used within a frequency band to be used to send a DMT signal are divided into groups. The initial grouping may be accomplished according to any number of algorithms, including simply selecting groups of sequential adjacent sub-channels (e.g., a first group including sub-channels 1-5, a second group including sub-channels 6-10, etc.). A group characteristics table may then be generated in block 530 to store common characteristics associated with all the sub-channels within a group. These characteristics may be determined based on the sub-channel within the group with the most limited characteristics (e.g., the bit capacity of the group may be determined by the sub-channel with the lowest bit capacity). The group characteristics may include, for example, the bit capacity of the sub-channel, the sub-channel gain, and information regarding the shaping of the signal at or near the sub-channel center frequency. The groups created in block 510 may then be re-ordered into non-sequential order, as shown in block 550. This re-ordering may include a straight alternating shuffle such as that previously described and illustrated in FIG. 3.

Referring again to FIG. 5, the sub-channels from the re-ordered groups of block 550 may then be subsequently re-sequenced into non-sequential order, as shown in block 570. This re-sequencing may include the ordered selection approach previously described and illustrated in FIG. 3. Once the re-sequencing is complete, individual bits within a data words may be assigned to individual DMT sub-channels based on the re-sequenced sub-channels and characteristics associated with the group to which the sub-channel is assigned (block 590). This allows transmit data to be encoded for a DMT transmission, receive data to be decoded from a received DMT transmission, or both.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    dividing a plurality of sub-channels within a discrete multi-tone symbol into a plurality of groups, each group comprising an equal number of sub-channels, and each sub-channel comprising a frequency bin with a unique center frequency;
    selecting each sub-channel of the plurality of sub-channels in non-sequential sub-channel order from the plurality of groups; and
    assigning data bits in bit order to each sub-channel in the order in which each sub-channel is selected.

2. The method of claim 1, wherein each of the plurality of groups of sub-channels is assigned a common sub-channel characteristic.

3. The method of claim 2, wherein the common sub-channel characteristic comprises a sub-channel data bit capacity.

4. The method of claim 2, wherein the common sub-channels characteristic comprises a sub-channel gain.

5. The method of claim 2, further comprising maintaining the common sub-channel characteristic for each of the groups of sub-channels in a group characteristics table.

6. The method of claim 1, further comprising re-ordering the plurality of groups of sub-channels before selecting each sub-channel.

7. The method of claim 6 wherein re-ordering the plurality of groups of sub-channels comprises algorithmically changing an order of the groups within the plurality of groups without altering the order of the sub-channels within each group.

8. The method of claim 7, wherein the algorithm used comprises a straight alternating shuffle between two collections of the plurality of groups, one collection comprising a first half of the plurality of groups, and the other collection comprising a second half of the plurality of groups.

9. The method of claim 1, wherein selecting each sub-channel in non-sequential order from the plurality of groups comprises algorithmically mapping each sub-channel within a group to a non-sequential sub-channel ordering.

10. A communication system, comprising:
    a processor that executes software;
    a discrete multi-tone (DMT) receiver, coupled to and configurable by the processor;
    a memory coupled to the processor; and
    a group tone order table stored in the memory, each group within the group tone order table comprising an equal number of DMT sub-channels each with a unique center frequency;
    wherein the software selects a sub-channel in non-sequential order with respect to an adjacent sub-channel; and
    wherein the software assigns data bits in bit order to the sub-channel in the order in which the sub-channel is selected.

11. The communication system of claim 10, wherein the software further re-orders each group within the tone group table prior to the selection of the sub-channel.

12. The communication system of claim 10, wherein data received by the DMT receiver is encoded within a received DMT signal according to the order in which each sub-channel is selected.

13. The communication system of claim 10, further comprising:
    a transmitter, coupled to and configurable by the processor;
    wherein the software configures the transmitter to send data encoded within a transmitted DMT signal according to the order in which each sub-channel is selected.

14. The communication system of claim 10, further comprising a group characteristics table that stores characteristics assigned to each group within the group tone order table.

15. The communication system of claim 14, wherein the characteristics comprise a common sub-channel bit capacity.

16. The communication system of claim 14, wherein the characteristics comprise a common sub-channel gain.

17. A storage medium containing software that can be executed on a processor within a communication system and that causes the processor to:
    divide a plurality of sub-channels within a discrete multi-tone signal into a plurality of groups of sub-channels, each sub-channel comprising a frequency bin with a unique center frequency;
    select sub-channels from the plurality of sub-channels in non-sequential sub-channel order from the plurality of groups; and
    assign data bits in bit order to the sub-channels in the order in which the sub-channels are selected.

18. The storage medium of claim 17, wherein the software further causes the processor to re-order the plurality of groups before the processor is caused to select the sub-channels.

19. The storage medium of claim 17, wherein the software causes the processor to assign a common sub-channel feature to a group of the plurality of groups.

20. The storage medium of claim 18, wherein the common sub-channel feature is a same sub-channel bit carrying capacity.

21. The storage medium of claim 18, wherein the common sub-channel feature is a same sub-channel gain.

22. The storage medium of claim 17, wherein the software further causes the processor to re-order the plurality of groups of sub-channels by algorithmically changing an order of the plurality of groups without altering the order of the sub-channels within each of the plurality of groups.

23. The storage medium of claim 17, wherein the software further cause the processor to select the sub-channels in non-sequential order from the plurality of groups by algorithmically mapping the sub-channels within a group to a non-sequential sub-channel ordering.

* * * * *